April 21, 1953  P. E. HAGGERTY  2,635,705
METHOD AND APPARATUS FOR SEISMIC PROSPECTING IN
WHICH SEISMIC WAVES ARE USED TO MODULATE
A SONIC OR SUPERSONIC CARRIER WAVE
Filed Oct. 22, 1948  2 SHEETS—SHEET 1

INVENTOR.
Patrick E. Haggerty
BY
Stevens, Davis, Miller and Mosher
ATTORNEYS

Patented Apr. 21, 1953

2,635,705

UNITED STATES PATENT OFFICE 2,635,705

METHOD AND APPARATUS FOR SEISMIC PROSPECTING IN WHICH SEISMIC WAVES ARE USED TO MODULATE A SONIC OR SUPERSONIC CARRIER WAVE

Patrick E. Haggerty, Dallas, Tex., assignor to Texas Instruments Incorporated, a corporation of Delaware Application October 22, 1948, Serial No. 55,988

2 Claims. (Cl. 181—.5)

This invention relates to seismometry and more particularly to a method and apparatus for detecting seismic waves in the earth's crust.

In exploring for oil, it is common to detonate a charge of explosives at some point on or below the earth's surface and then to detect the seismic waves created by this explosion after those waves have passed through a portion of the earth's crust and have been either reflected or refracted by the various geological strata.

It is common practice to arrange a series of detectors about or in a line from the point of explosion and record the signals received at the various detectors in correlation with time, the time scale starting at the time of the detonation of the explosive.

Many arrangements have been proposed for improving the detection and interpretation of the seismic waves generated by the charge of explosives and of eliminating unwanted disturbances from the records.

It is therefore an object of this invention to greatly simplify the expedient necessary to eliminate unwanted signals from a seismic record and in so doing to present a far more accurate and more easily available analysis of geological conditions.

Generally, the first waves to arrive at the detector are longitudinal waves in which the particles vibrate in the direction of propagation of the waves. Transverse waves generally arrive next. In the transverse waves, the particles vibrate in a plane perpendicular to the direction of propagation. Thereafter still other waves arrive. Their exact nature has even as yet not been fully determined, although certain of them have been at least tentatively classified and named, as for example, the Rayleigh and Love waves.

The longitudinal waves appear generally to be the most useful in seismology, especially in reflection shooting, and one of the objects of any detector system or arrangement is to avoid the confusion of these waves with a later-arriving transverse, Rayleigh, Love or other waves. When we speak of the later-arriving waves, it will be understood that while these waves arrive later if they travel the same path as the longitudinal waves, they may arrive simultaneously when they travel a shorter path. Thus, the reflected longitudinal waves from deeper strata may well arrive at the same time as do the transverse, Rayleigh, Love or other waves from shallower strata. The problem thus far has been susceptible only to empirical attack because insufficient knowledge of the way the various waves behave exists.

It has been found that where strong interfering waves exist, it is practically impossible to distinguish between wanted and unwanted waves or to eliminate the unwanted waves so long as only one or very few seismometers of very small size are used. However, it has been found that by using a whole series of seismometers, usually arranged in the line extending radially from the shot point and placed quite close together, and then by combining the outputs of these seismometers, the unwanted waves may be caused to cancel themselves at least to an appreciable extent. Furthermore, such an arrangement tends to eliminate from the record the effects of conditions local to a particular seismometer.

Such an arrangement as has been described in the preceding paragraph is difficult to accomplish in actual practice because of the large number of seismometers required. In addition, further benefit can sometimes be obtained if these many seismometers can be placed below the weathered layer, which is a relatively shallow layer at the immediate surface of the earth. Obviously, if a large number of seismometers are to be used, it will be extremely difficult to locate all of these seismometers below the weathered layer for this would require a large number of holes dug or drilled through the weathered layer.

Accordingly, it has been found desirable to have a continuous seismometer or a seismometer that is continuous in effect and which seismometer will extend over a considerable distance along the surface of the earth, or at will along a line below the surface of the earth and thus below the weathered layer.

In accordance with this invention it has been discovered that such a seismometer may be provided by passing waves of sonic frequency or supersonic frequency through the earth. Such waves, it has been found, will be modulated both as to amplitude and as to instantaneous frequency by the seismic waves, thus causing the earth itself, in a sense, to become a continuous detector of the desired seismic waves.

A number of arrangements may be used to effect this desired result and several alternative arrangements are illustrated in the drawings accompanying this application. Basically, however, the arrangement comprises a means to generate seismic waves, which will commonly be a charge of dynamite located in a shot hole dug or drilled into the ground and connected to a detonator for firing. The detector then will consist of a generator of sonic or supersonic waves, preferably of a fixed frequency, and this generator, preferably, will also be located in a hole extending below the weathered surface of the earth. Spaced from this generator will then be a detector of sonic or supersonic waves of about the frequency of the transmitter and this detector like the generator will generally be placed in a hole beneath the weathered surface of the earth.

Usually, the explosive, the generator and the detector will all be placed in a line for it has been found that this arrangement in general tends best to eliminate unwanted disturbances from the record. Now, with the generator operating, the detector will detect the sonic or supersonic wave of the frequency emitted by the transmitter and the electrical signal which detector will generate in accordance therewith will be carried to the necessary amplifying and recording equipment. If this equipment is arranged to amplify and demodulate the signals from the detector there will generally be no signal left to record because the wave generated by the sonic or supersonic generator will generally be unmodulated.

Now, if the explosive is detonated it will be found that as the seismic vibrations from the explosion cross the path by which the sonic or supersonic vibrations travel from the generator to the detector, these sonic or supersonic waves will be modulated in accordance with the vibrations produced by the explosion, either as these seismic vibrations originally cross the path directly from the point of explosion or as these seismic vibrations are refracted or reflected from subterranean strata and then cross the path.

It will at once be apparent that the generator of sonic or supersonic waves may be placed either above or below the detector in the same hole, may be laterally displaced from the detector, or may be both laterally and vertically displaced from the detector. Both the generator and the detector may be placed on the surface of the ground, both may be placed at any desired distance below the surface, one may be placed lower than the other and in fact they may be placed in any desired spaced arrangement, the only positive requirement being that they be spaced far enough apart so that the waves passing therebetween may be modulated by the seismic waves to be detected. This distance may vary from a few inches to thousands of feet although generally it will be desirable to separate the generator and the detector by at least 30 or 40 feet and in most cases the difficulty of transmission, that is, the difficulty of generating a wave of sufficient power will limit the distance of separation to a thousand feet or less.

It will at once be apparent that the percentage of amplitude modulation of the wave that we shall refer to, generally, as sonic, even though it may be supersonic, will depend upon the relative amplitudes of the sonic wave and the seismic wave. This also appears to be true of frequency modulation. Thus, in order to keep the percentage of modulation relatively constant, it will in most instances be desirable to gradually reduce the amplitude of the sonic wave as the reflections arrive from deeper and deeper strata and therefore are weaker and weaker, or lower and lower in amplitude. This may be accomplished by automatically measuring the percentage of modulation at the detector and automatically changing the amplitude of the sonic wave emitted by the generator to return the percentage modulation to some approximately fixed percentage. At the same time automatic volume control may be used in the amplifier at the recorder to compensate for changes in the amplitude of the detected, modulated sonic wave.

Further details and advantages of this invention will be apparent from the drawings and the following description of the several specific embodiments illustrated therein.

Figure 1:
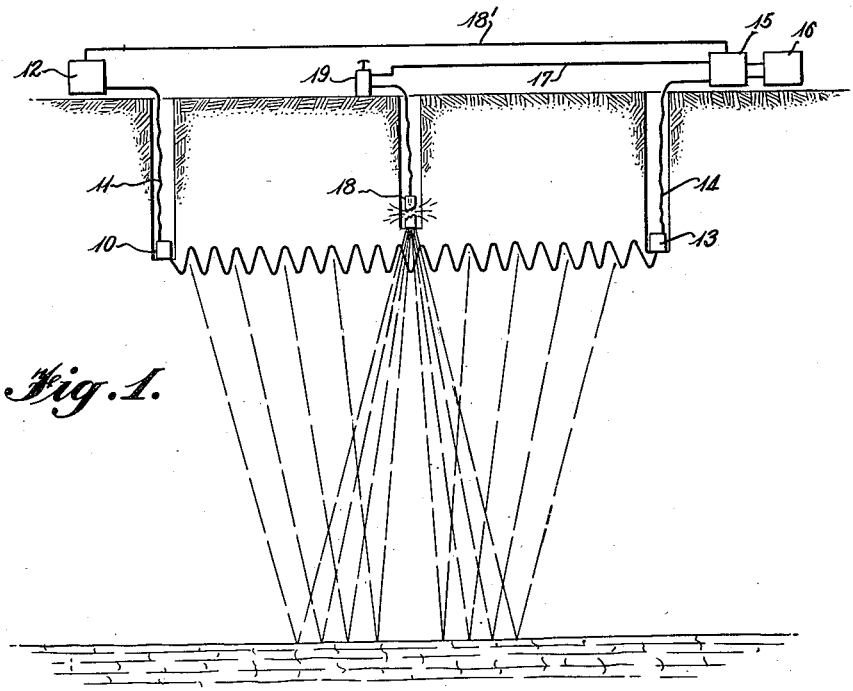
Figure 1 is a diagrammatic illustration of the preferred embodiment of this invention in which both the sonic transmitter and the sonic receiver are buried in the earth below the weathered layer and the charge of explosive is placed midway between them.

As illustrated in Figure 1, a generator of sonic or supersonic waves 10 is placed in a hole in the earth's surface below the weathered layer of the earth. This generator of sonic or supersonic waves is connected by appropriate electrical wiring 11 to a power source 12 at the surface of the earth. Generally, it will be desirable to use a vibrator of some kind as the generator of sonic or supersonic waves 10 and to power this vibrator with a fixed frequency electrical current from a fixed frequency generator 12.

Spaced from the generator of sonic or supersonic waves 10 is a receiver or detector of sonic or supersonic waves 13. As illustrated in Figure 1 this detector or receiver is also positioned in a hole drilled through the weathered layer and into the earth beneath. A geophone having a sufficiently high frequency response or any other device for converting vibrations of the frequency involved into electrical signals may be utilized for this purpose. The detector 13 is connected by suitable electrical connections 14 to a control circuit 15 at the surface of the earth and here the electrical output of the detector is generally amplified, demodulated and the modulation passed on to a recorder 16 which records the modulation in correlation with elapsed time. By appropriate known circuit arrangements either the amplitude modulation or the frequency modulation may be recorded.

Seismic waves are created, as illustrated in Figure 1, by a charge of dynamite or other explosives 18, positioned in a hole in the earth and connected for detonation through a blaster or detonator 19 positioned on the surface of the earth.

When the current generator 12 is arranged to generate a fixed frequency electrical current and to drive the generator of sonic or supersonic vibration 10, a portion of these sonic or supersonic vibrations will travel in an approximately straight line to the detector or receiver 13 where they cause to be generated a fixed frequency electrical current, which will be introduced into the electrical circuit 15, there to be amplified, and demodulated. But since there will be no modulation on this electrical current there will be nothing remaining to transfer to the recorder 16.

With this condition existing, if the blaster 19 is operated to explode the charge of dynamite 18, seismic waves will cross and recross the path of the sonic or supersonic waves traveling between the generator and the detector. It has been found that these seismic waves in crossing and recrossing the path of these sonic or supersonic waves will cause an instantaneous modulation of these sonic or supersonic waves so that when these sonic or supersonic waves are detected, and the electrical signals corresponding thereto sent to the electrical circuit 15, these electrical signals will be modulated in accordance with the seismic waves that have crossed and recrossed the path of the sonic or supersonic waves. Thus, after they have been amplified and demodulated, there will be modulation to be passed on to the recorder and recorded in correlation with time.

Now in order that the timing of this record of modulation start with the time of explosion, it has been found desirable to connect the blaster circuit to the recorder, much as is done in ordinary seismic prospecting and this has been done in the present instance by the use of suitable connections 17 which connect the blaster with the circuit 15 which processes this signal, and feeds it to the recorder, in accordance with well known principles, in such a way as to place on the record the usual time break signal.

Still further it has been discovered that the percentage modulation of the sonic or supersonic waves is dependent upon the relative strength of the seismic waves and the sonic or supersonic waves passing between the generator and the detector. Thus, when the seismic waves are powerful as they are immediately following the explosion, it is desirable to have the sonic waves at a relatively high amplitude, but as the seismic waves become weaker, with the passage of time after the explosion, it is desirable that the amplitude of the sonic waves be sharply reduced. This can be accomplished by measuring, in the circuit 15, the percentage of modulation, and adjusting the power fed to the generator of sonic or supersonic waves by the generator 12 in accordance therewith. The circuits necessary to accomplish this are well known to the art and, hence, are not shown in detail but connnections 18' between the electrical circuit 15 and the power generator 12 are indicated for the purpose of accomplishing this control.

Circuit 15 will ordinarily include automatic volume control for the amplifier so that the amplitude of the modulated signal wave will be at least approximately constant, will include demodulating means for removing the modulation from the signal wave, may include additional amplification for the modulation after it has been removed from the signal wave, and will also preferably include means for determining the percent of modulation and controlling the power generator 12 so as to decrease its power output as the percentage of modulation tends to decrease.

Figure 2:
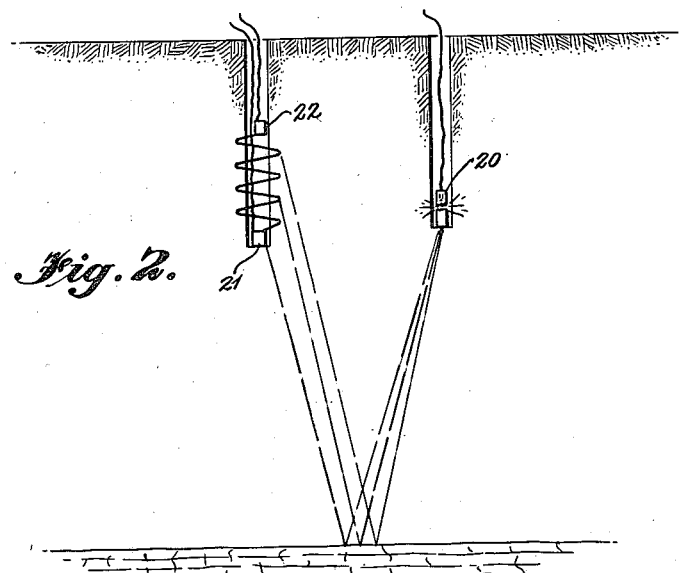
Figure 2 is a diagrammatic illustration of an embodiment of this invention in which the sonic transmitter and detector are placed one above the other in a hole in the earth drilled through the weathered layer and the charge of explosive is positioned at some distance therefrom.

Figure 2 illustrates an arrangement in which the explosive charge 20 is positioned beneath the surface and the sonic or supersonic generator 21 is also positioned beneath the surface at some distance therefrom. In this instance, however, the detector of sonic or supersonic vibrations 22 is positioned directly above the generator of sonic or supersonic vibrations, rather than being horizontally offset therefrom. In many instances, this arrangement is quite satisfactory, particularly for the reception of reflected seismic vibrations as distinguished from refracted seismic vibrations. The surface equipment is the same as is diagrammatically illustrated in Figure 1 and is not here repeated.

Figure 3:
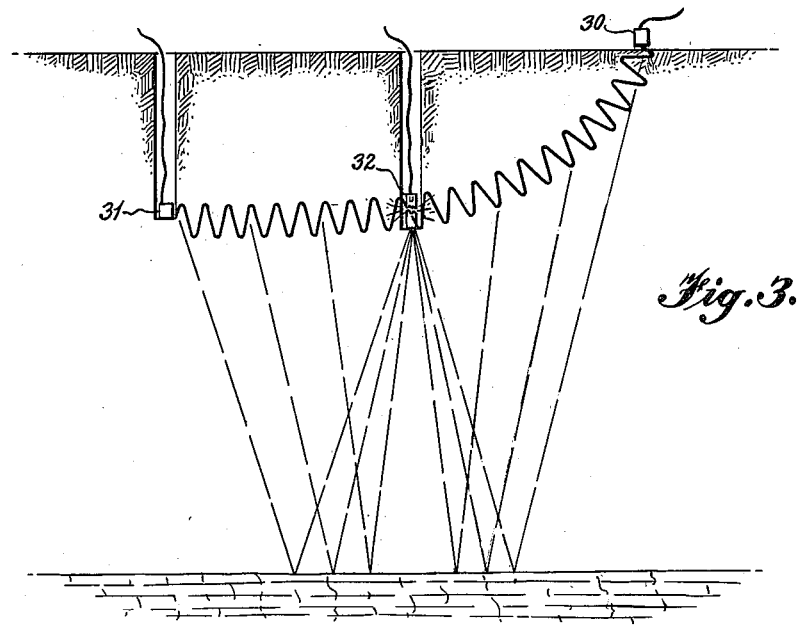
Figure 3 is a diagrammatic illustration of still another embodiment of this invention in which the sonic transmitter is placed below the weathered layer and the sonic receiver is placed on the surface of the earth at some distance therefrom, with the charge of explosive placed below the surface of the earth between the transmitter and the detector.

Figure 3 illustrates an arrangement similar to Figure 1 except that the detector of the sonic or supersonic vibrations 30 is located at the surface of the earth. The generator of these vibrations 31 is located beneath the earth's surface as is the charge of explosives 32. Again the charge of explosive is located between the generator and the detector, but in this case the generator and detector are both vertically and laterally displaced from each other. Such a system gives some of the advantages of the system of Figure 1, without the necessity of drilling a separate hole for the detector and is especially useful where the weathered layer at the detector is very thin or entirely absent.

Figure 4:
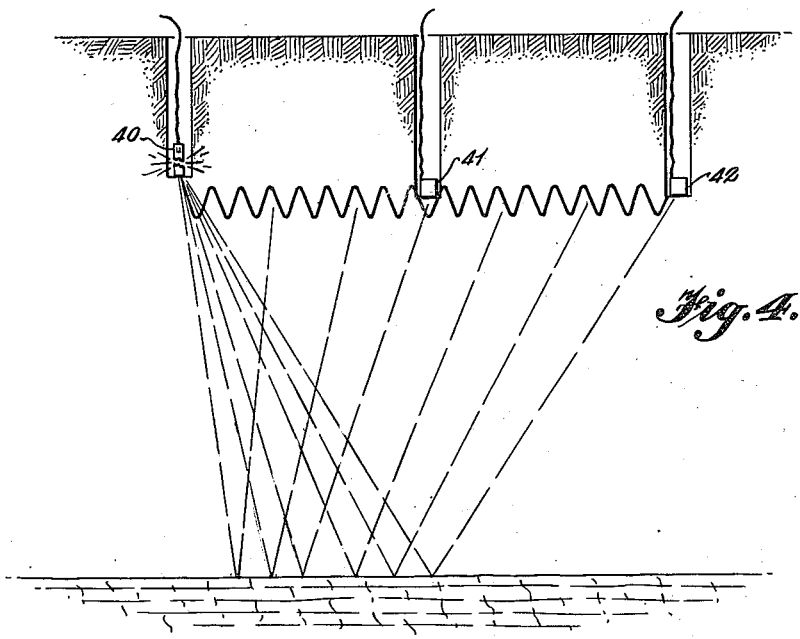
Figure 4 is still another embodiment of this invention in which the sonic transmitter and the sonic receiver are both placed below the surface of the earth, but at some distance apart and the charge of explosive is placed in a line with but at some distance from both the transmitter and the detector.

Figure 4 is again similar to Figure 1 except that the charge of explosives 40 is not placed between the generator 41 and the detector 42 but rather is placed on a line with these two elements and at some distance away from them. This arrangement is particularly useful where it is desired to determine the contour of strata at a point intermediate the point where the explosion takes place and the points where the generator and detector are located, and particularly where it is not convenient to place the explosive directly over the strata being investigated.

It will be apparent from the foregoing description that numerous variations in the relative locations of the explosive and the generator and the receiver may be made without departing from the spirit of this invention. It will also be apparent that the details of the circuit illustrated graphically by the boxes 12 and 15, and the construction of the sonic or supersonic generator and the sonic or supersonic detector 13 are not a part of this invention. Known equipment and known circuits can be used for these purposes and therefore these elements have not been specifically described.

What is claimed is:

1. The method of seismic prospecting that comprises continuously generating waves of the class consisting of sonic and supersonic waves, at a point in the earth's crust and transmitting such continuously generated waves through the earth's crust to a second point in the earth's crust that is spaced therefrom; generating a sharp burst of seismic waves at some point in the earth's crust during said continuous generation of waves so that said sharp burst of waves will pass through portions of the earth's crust and encounter and modulate the continuously generated waves; converting the continuously generated waves arriving at the second point into electrical signals and recording said electrical signals so that the variations therein may be used as indications of the geological structure encountered by the seismic waves of the sharp burst.

2. An apparatus for seismic prospecting that comprises a generator for continuously generating waves of the class consisting of sonic and supersonic waves, at a point in the earth's crust and transferring these waves to the earth's crust, a detector for detecting said continuously generated waves at a second point in the earth's crust spaced from the first point, said detector being of the type that will convert the waves into electrical signals, means for generating a sharp burst of seismic waves at some point in the earth's crust so that said sharp burst of seismic waves will pass through portions of the earth's crust and encounter and modulate the continuously generated waves passing through the earth's crust, and means for amplifying and recording the electrical signals from the detector as indications of the geological structure encountered by the seismic waves of the sharp burst.

PATRICK E. HAGGERTY.

References Cited in the file of this patent

UNITED STATES PATENTS

| Number | Name | Date |
|---|---|---|
| 1,790,080 | Stanton | Jan. 27, 1931 |
| 2,054,067 | Blau | Sept. 15, 1936 |
| 2,148,679 | Blau et al. | Feb. 28, 1939 |
| 2,207,281 | Athy | July 9, 1940 |
| 2,521,130 | Scherbatskoy | Sept. 5, 1950 |